United States Patent [19]

Sakamoto

[11] Patent Number: 4,768,838
[45] Date of Patent: Sep. 6, 1988

[54] WHEEL CAP

[75] Inventor: Fujio Sakamoto, Nagoya, Japan

[73] Assignee: Toyoda Gosei Co., Ltd., Nishikasugai, Japan

[21] Appl. No.: 37,111

[22] Filed: Apr. 10, 1987

Related U.S. Application Data

[63] Continuation of Ser. No. 760,588, Jul. 30, 1985, abandoned.

[30] Foreign Application Priority Data

Aug. 3, 1984 [JP] Japan .......................... 59-120521[U]

[51] Int. Cl.⁴ ............................................... B60B 7/06
[52] U.S. Cl. .............................. 301/37 C; 301/37 R; 301/37 P
[58] Field of Search ................. 301/37 R, 37 P, 37 C, 301/37 CD, 108 R, 108 A; 220/317, 319, 320; 403/326

[56] References Cited

U.S. PATENT DOCUMENTS

| | | |
|---|---|---|
| 1,836,424 | 12/1931 | Yanss . |
| 3,121,583 | 2/1964 | Damm ............................ 403/326 X |
| 3,747,984 | 7/1973 | Andrews et al. .................. 301/37 P |
| 4,027,919 | 6/1977 | Foster et al. .................. 301/37 P X |
| 4,457,559 | 7/1984 | Renz ................................... 301/37 P |

FOREIGN PATENT DOCUMENTS 3016619 11/1981 Fed. Rep. of Germany .... 301/37 R

Primary Examiner—James B. Marbert
Attorney, Agent, or Firm—Cushman, Darby & Cushman

[57] ABSTRACT

Disclosed herein is a wheel cap comprising a wheel cap body provided with engagement portions to be engaged with a wheel disc, and a linear elastic member mounted to the wheel cap body and adapted to bias the engagement portions in such a direction as to press-contact the engagement portions with the wheel disc, wherein the linear elastic member is in the form of an endless circle having a plurality of loop-like flexible portions along a circumference thereof. With this arrangement, installation of the wheel cap body to the wheel disc may be improved, and a mount space of the flexible portions may be effectively utilized.

2 Claims, 2 Drawing Sheets

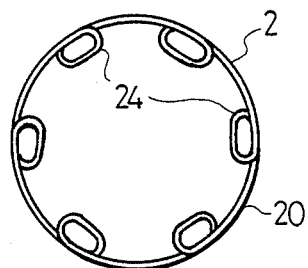
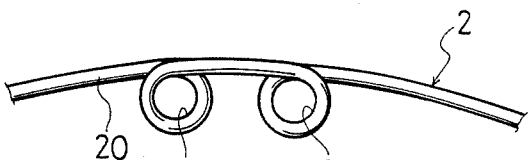
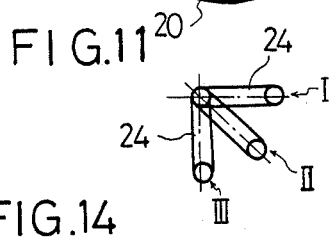
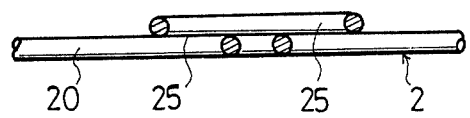
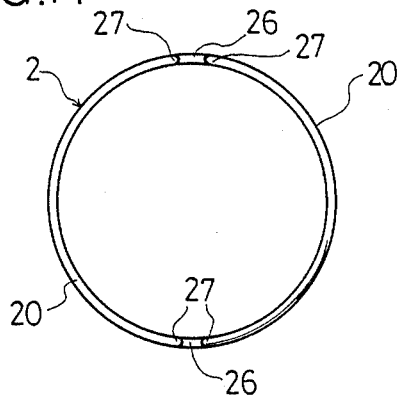
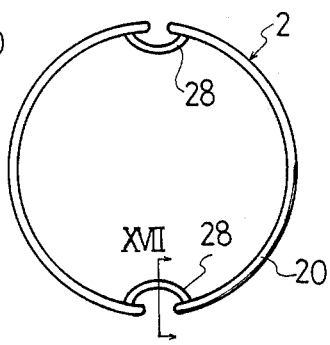
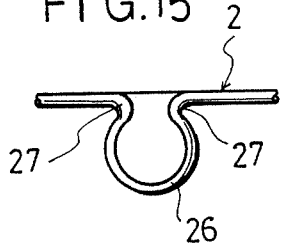
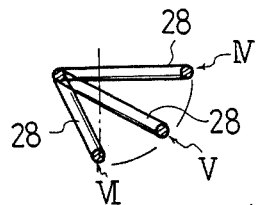
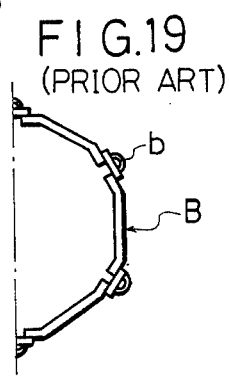

WHEEL CAP

This is a continuation of application Ser. No. 760,588, filed July 30, 1985, which was abandoned upon the filing hereof.

BACKGROUND OF THE INVENTION

This invention relates to an improvement in a wheel cap to be mounted to a wheel disc of an automobile and the like, and more particularly to a wheel cap which may be simply and properly mounted.

Conventionally, a wheel cap is made of metal, and it is fixedly engaged with a wheel disc by utilizing a resilient force of the metal.

On the other hand, as a resin wheel cap, there is known a wheel cap including a so-called wire ring holder which is provided with a plurality of engagement portions on a circumference thereof so as to be engaged with the wheel disc and is further provided with a linear elastic member for biasing the engagement portions to the wheel disc in such a direction as to press-contact the former with the latter.

As shown in FIG. 18, a half of the conventional wheel cap being shown in section, the wheel cap is annularly formed as a whole, and is provided with a linear elastic member A having a plurality of stepped projections (a) which are bent in an outer circumferential direction. Similarly, as shown in FIG. 19, another conventional wheel cap is provided with a linear elastic member B having projections (b) which are curved in an outer circumferential direction.

The linear elastic member A is designed to bias the engagement portions of the wheel cap in a centrifugal direction by the projections (a). On the other hand, as to the linear elastic member B, the projections (b) itself serve both as an engaging means and a biasing means. However, the linear elastic member A is complicated in structure, and therefore there is a problem in workability such as dimensional accuracy. The linear elastic member B has problems of poor flexibility and difficult installation to the wheel cap.

SUMMARY OF THE INVENTION

Accordingly, it is an object of the present invention to provide a wheel cap having a linear elastic member which is simple in structure, and may be simply mounted to the wheel cap.

It is another object of the present invention to provide a wheel cap which may be securely and smoothly installed to the wheel disc, and may allow a mount space of the linear elastic member to be effectively utilized.

According to the present invention, the wheel cap comprises a wheel cap body provided with engagement portions to be engaged with a wheel disc, and a linear elastic member mounted to the wheel cap and adapted to bias the engagement portions in such a direction as to press-contact the engagement portions with the wheel disc, wherein the linear elastic member is in the form of an endless circle having a plurality of loop-like flexible portions along a circumference thereof.

The linear elastic member is in the form of an apparently endless circle, and is provided with a plurality of loop-like flexible portions along a circumference thereof, so as to provide desired flexible characteristics. The loop-like flexible portions may be in the form of at least a single winding which is continuously formed, so as to increase flexible characteristics. Further, the loop-like flexible portions may be in the form of a Greek letter $\Omega$ forming separate portions, so as to secure a large quantity of deformation. A mount plane of the flexible portions may be arranged at predetermined angles from a radial direction of the wheel cap to an axial direction thereof, so that the flexible portions may be suitably mounted in consideration of a mount space.

As the linear elastic member of the wheel cap according to the present invention is in the form of an apparently endless circle, and is provided with a plurality of loop-like flexible portions along a circumference thereof, flexible characteristics of the linear elastic member are superior to secure a large quantity of deformation. When the wheel cap is mounted to the wheel disc, it is easily resiliently deformed, and a press-contact condition of the wheel cap body with the wheel disc may be stably and smoothly secured.

According to the present invention, a mount load of the wheel cap body to the wheel disc may be properly secured by the linear elastic member having the loop-like flexible portions, and a degree of freedom of the mount load may be increased. That is to say, a mount rigidity of the wheel cap body may be sufficiently adapted by a shape, number, structure or mount form of the flexible portions of the linear elastic member. Additionally, a mount plane of the loop-like flexible portions may be arranged at predetermined angles from the radial direction of the wheel cap to the axial direction thereof, thereby permitting a mount space of the flexible portions to be effectively utilized.

Furthermore, the linear elastic member of the wheel cap is simple in structure, and the wheel cap may be securely mounted to the wheel disc by a simple installation or assembling work. After installation of the wheel cap to the wheel disc, the wheel cap may be stably retained with a high reliability.

Other objects and advantages of the invention will become apparent from the following description and accompanying drawing.

BRIEF DESCRIPTION OF THE DRAWING

The exact nature of this invention, as well as other objects and advantages thereof, will be readily apparent from consideration of the following specification relating to the annexed drawing in which:

FIG. 10 is a plan view of the wire spring having loop-like flexible portions in the form of a singly wound ellipse shape according to still another modification of the first preferred embodiment;

FIG. 11 illustrates various mounting angles of the loop-like flexible portions of the wire spring of FIG. 10;

FIG. 12 is a partly plan view showing the loop-like flexible portions which is still another modification of the first preferred embodiment;

FIG. 13 is a fragmentary sectional view of the flexible portion of the wire spring of FIG. 12;

FIG. 14 is a plan view of the wire spring having the loop-like flexible portions in the shape of Greek letter Ω in a second preferred embodiment;

FIG. 15 is a front view showing the flexible portion of the wire spring of FIG. 14;

FIG. 16 is a plan view of the flexible portions of the wire spring in a modification of the second preferred embodiment;

FIG. 17 illustrates various mounting angles of the loop-like flexible portions of FIG. 16;

FIG. 18 is a fragmentary sectional view of an essential part of a prior art device; and, FIG. 19 is a fragmentary sectional view of an essential part of another prior art device.

DETAILED DESCRIPTION OF THE PREFERRED EMBODIMENTS

Figure 1:
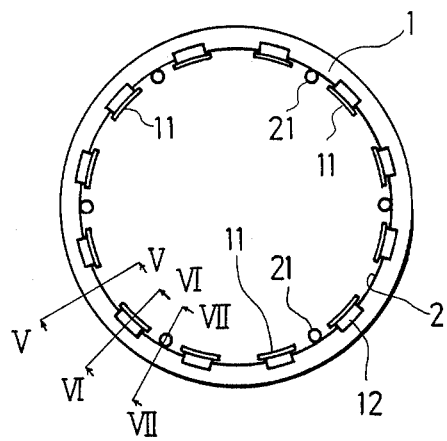
FIG. 1 is a plan view of a wheel cap of a first preferred embodiment according to the present invention.
Figure 2:
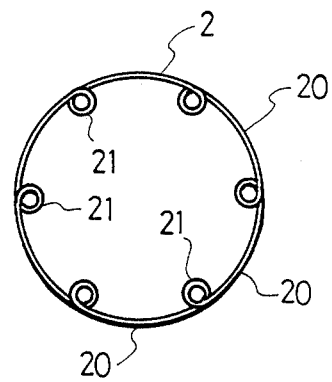
FIG. 2 is a plan view of a wire spring forming loop-like flexible portions in the first preferred embodiment.
Figure 3:
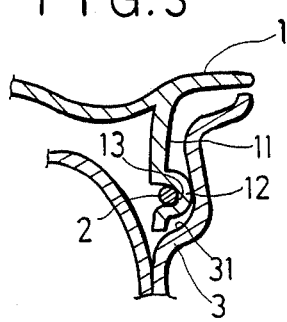
FIG. 3 is a fragmentary sectional view of a engagement portion of the wheel cap body having the wire spring incorporated and engaged with a wheel disk.

Referring to FIGS. 1 to 7 which show a first preferred embodiment of the present invention, and particularly, FIG. 1 showing a plan view of a wheel cap according to the first preferred embodiment, the wheel cap is constituted of a wheel cap body 1 formed of plastics and a linear elastic member 2. The wheel cap body 1 is provided with a plurality of axially projecting engagement portions 11 on the same circumference on the back side thereof. As shown in FIG. 3, the engagement portions 11 are formed with convex portions 12 fitted to concave portions 31 of a wheel disc 3 with respect to a circumferential direction thereof as viewed sidewardly. That is to say, the wheel cap body 1 is designed to be engaged with the wheel disc 3. The convex portions 12 of the wheel cap body 1 are inwardly formed with grooves 13 fittedly receiving the linear elastic member 2 which is concretely a wire spring of sectionally solid form. As shown in FIG. 2, the wire spring is apparently annular, and a part of the wire spring is engaged with the grooves 13 to be positioned. The wire spring acts to press-contactingly bias the convex portions 12 against the concave portions 31 of the wheel disc 3 thereby to tightly engage the wheel cap body 1 with the wheel disc 3.

Figure 7:
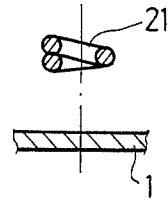
FIG. 7 is a fragmentary view of the wheel cap body and the flexible portion of the wire spring which is mounted parallel to a radial direction of said wheel cap body in the first preferred embodiment.

As shown in FIG. 2, the wire spring in the first preferred embodiment is formed with flexible portions 21 on the inside of the circumference thereof. The flexible portions 21 are in the form of a singly wound loop which is really circular. As shown in FIG. 7, a mount plane of the flexible portions 21 is parallel to a radial direction of the wheel cap body 1.

Figure 4:
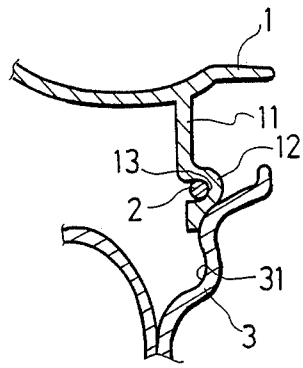
FIG. 4 is a fragmentary sectional view showing a prior state of FIG. 3.
Figure 5:
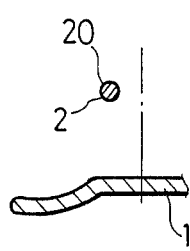
FIG. 5 is a fragmentary sectional view of the wheel cap body and the wire spring in the first preferred embodiment.
Figure 6:
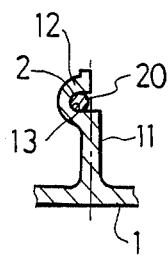
FIG. 6 is a fragmentary sectional view showing the wire spring preliminarily engaged with a groove of the wheel cap body in the first preferred embodiment.

In connection with the above-mentioned constitution of the first preferred embodiment, the wheel cap body 1 is mounted to the wheel disc 3 in such a manner that an annular portion 20 of the wire spring is preliminarily engaged with the grooves 13 of the wheel cap body 1 as shown in FIG. 6. Then, as shown in FIG. 4, the convex portions 12 of the wheel cap body 1 are inwardly offset against a resilient force of the wire spring, and are inserted into the concave portions 31 of the wheel disc 3. As a result, the engagement portions 11 of the wheel cap body 1 are brought into press-contact with the concave portions 31 of the wheel disc 3 as shown in FIG. 3, and the axial movement of the wheel cap body 1 is restricted by the engagement of the convex portions 12 and the concave portions 31. Accordingly, the wheel cap body 1 is mounted to the wheel disc 3 in a predetermined position. With this arrangement, even if an external deforming force is applied to the wheel disc 3, the loop-like flexible portions 21 of the wire spring incorporated in the wheel cap body 1 are sensitively resiliently deformed to a large extent. As a result, such a deforming force is sufficiently absorbed by each of the flexible portions 21, thereby securing a stable and smooth press-contact condition. In this manner, according to the first preferred embodiment, a mount load of the wheel cap body 1 to the wheel disc 3 may be properly secured by the provision of the loop-like flexible portions 21.

The wire spring in the first preferred embodiment is formed of a spring steel having a diameter of 2-3.5 mm. However, a degree of freedom for the mount load as aforementioned may be increased by varying the diameter of the wire spring or a loop diameter.

Figure 8:
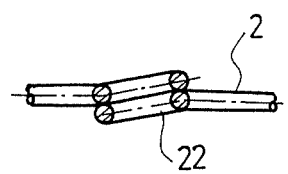
FIG. 8 is a fragmentary sectional view of the wire spring forming a double wound loop-like flexible portion in a modification of the first preferred embodiment.
Figure 9:
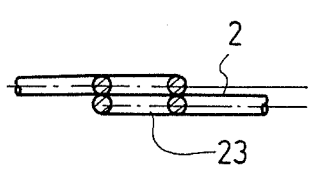
FIG. 9 is a fragmentary sectional view of the wire spring forming a double wound loop-like flexible portion according to another modification of the first preferred embodiment.

Although the loop-like flexible portions 21 are of a singly wound real circle, and are arranged in substantially parallel relation with the radial direction of the wheel cap body in the first preferred embodiment, double wound loop-like flexible portions 22 and 23 as shown in FIGS. 8 and 9 may be arranged in an offset position with respect to an axial direction of the wheel cap body 1, or in parallel relation with the radial direction of the wheel cap body 1. Such modification may exhibit the substantially same operation and effect as with the first preferred embodiment.

As shown in FIG. 10, a loop-like flexible portions 24 is in the form of a singly wound ellipse having a loop diameter of 5 mm and a length of 20 mm. As shown in FIG. 11, a mount plane of the flexible portions 24 are selectively arranged in parallel relation I with the radial direction of the wheel cap body 1, or in inclined relation II at an angle of 45 degrees, or in parallel relation III with the axial direction of the wheel cap body 1, thereby corresponding to a mount space at a narrow area between the wheel cap body 1 and the wheel disc 3, and effectively utilizing the mount space to properly install the flexible portions 21. Further, as shown in FIGS. 12 and 13, the loop-like flexible portions are formed in a pair of singly-wound really-circular loops which are different in a winding direction and are arranged adjacent to each other. Such modifications as mentioned above exhibit the substantially same operation and effect as with the first preferred embodiment.

Referring to FIGS. 14 and 15 which show a second preferred embodiment of the present invention, the constitution is substantially similar to that of the first preferred embodiment except that loop-like flexible portions 26 are in the form of a Greek letter Ω such that they are separated at opposite turning points 27, so as to secure a large quantity of deformation owing to the provision of such separate portions, and that the loop-like flexible portions 26 are arranged in parallel relation with the axial direction of the wheel cap body 1. The operation and effect of the second preferred embodiment are the substantially same as those of the first preferred embodiment.

In a modification of the second preferred embodiment, as shown in FIG. 16, loop-like flexible portions 28 are in the form of ellipse, and as shown in FIG. 17, a mount plane thereof is selectively arranged in parallel relation IV with the radial direction of the wheel cap body 1, or in inclined relation V or VI at an angle of 35 degrees or 70 degrees, or in parallel relation (not shown) with the axial direction of the wheel cap body 1. Further, the flexible portions may be formed in a real circle or ellipse, and a plurality of the flexible portions may be arranged adjacent to each other, thereby effectively utilizing a mount space at a narrow area between the wheel cap body 1 and the wheel disc 3 to securely install the flexible portions. Such a modification may exhibit the substantially same operation and effect as with the first preferred embodiment.

In the above-mentioned preferred embodiments, the loop-like flexible portions may sufficiently cope with a mount rigidity (load) of the wheel cap body to the wheel disc by varying a size, shape, mount number or angle of the mount plane (with respect to the axial direction of the wheel cap) of the flexible portions, or a diameter of the wire spring, or by using a sectionally hollow wire spring. Further, the mount space of the flexible portions may be sufficiently secured.

Having thus described the preferred embodiments of the invention, it should be understood that numerous structural modifications and adaptations may be restored to without departing from the spirit of the invention.

What is claimed is:

1. A wheel cap comprising a wheel cap body provided with engagement portions to be engaged with a wheel disc, and a linear elastic member mounted to said portions in such a direction as to press-contact said engagement portions with said wheel disc, wherein said linear elastic member is in the form of an endless circle comprising arc portions to engage with said engagement portions and, between said arc portions, a plurality of wound loop flexible portions wherein said member curves back to cross itself in such a manner that said wound loop flexible portions extend radially inward from the circumference of a circle composed of said arc portions and the axis of said arc-portions circle and the axes of said wound loop flexible portions are in a parallel relationship.

2. A wheel cap as defined in claim 1, wherein said engagement portions are arranged in a circle with equal intervals therebetween and said wound loop portions are arranged to be located between only at least every other two of said intervals.

* * * * *